Sept. 14, 1943.   N. G. HOLDEN   2,329,677
STATISTICAL MACHINE
Filed Oct. 1, 1937   7 Sheets-Sheet 1

Sept. 14, 1943. N. G. HOLDEN 2,329,677
STATISTICAL MACHINE
Filed Oct. 1, 1937 7 Sheets-Sheet 6

Fig. 6.

INVENTOR
N. G. HOLDEN
BY
Sydney L. Page
ATTORNEY

Fig. 6A.

Patented Sept. 14, 1943

2,329,677

UNITED STATES PATENT OFFICE 2,329,677

STATISTICAL MACHINE

Norman Geoffrey Holden, Carshalton, England, assignor to Powers Accounting Machines Limited, London, England, a corporation of Great Britain Application October 1, 1937, Serial No. 166,845
In Great Britain October 10, 1936

1 Claim. (Cl. 235—61.9)

This invention relates to record controlled tabulating machines of the kind including a plurality of denominational actuators, an accumulator wheel to each actuator, a corresponding plurality of denominational columns of stops, each column including a zero stop normally effective to block movement of the corresponding actuator, and means whereby the setting of any other stop in a column tends to render the zero stop for that column ineffective, means operative in each machine cycle to free the actuators for movement under control of the corresponding stops to take a setting from said stops, said means being also operative to restore said actuators, accumulator wheel control mechanism normally conditioned to effect engagement of the wheels with the actuators after they have been set from the stops, and a total shaft serving, when actuated, to condition the accumulator wheel control mechanism to effect engagement of the wheels with the actuators before said actuators have been freed for movement.

The object of the invention is to provide a construction of the above kind of machine in which the zero stops for any one or more of a plurality of actuators may, by means of a simple manual control applicable to the zero stops individually, be maintained effective at all times, except during a total cycle and the first record reading cycle thereafter, or may be released for normal operation under the control of the record at each record reading cycle.

According to the present invention a machine of the kind above referred to comprises in combination a locking member to each zero stop, resilient means individual to each locking member urging said member into engagement with its associated zero stop to maintain said stop effective, each of said locking members being mounted for individual withdrawal manually from engagement with its zero stop, means for manually latching each locking member individually in the withdrawn position, means operated by the total shaft to withdraw from engagement with their associated zero stops all those locking members which are unlatched, a second latching means common to all said locking members, resilient means rendered effective when said locking members are thus withdrawn by the total shaft to cause said common latching means to retain said locking members withdrawn, a pawl and ratchet device adapted to release said common latching means in stages, one stage at each actuation of the pawl, and means for actuating the pawl at each machine cycle to effect one stage of the release of said common latching means at each machine cycle until the release is completed, the relation between the pawl and ratchet device and said common latching means being such that the release of said latching means is complete after the data on the first record following a total has been read and entered into the accumulator wheels.

In constructions according to the invention any desired actuator may be selected to print designations by manually withdrawing and latching the locking members for the zero stops associated with all the remaining actuators. The zero stops in respect of which the locking members are thus withdrawn and latched will operate normally so that data read from successive records will be entered into the corresponding accumulator wheels by the associated actuators. The zero stops in respect of which the locking members have not been withdrawn, will be held effective at each record reading cycle save the first following a total and will also be rendered ineffective at each total cycle, so that designations can be entered into the corresponding accumulator wheel in the first record reading cycle and stored thereby until the next following total cycle, when they are printed.

The invention will now be described with reference to the accompanying drawings in which the invention is diagrammatically illustrated as applied to a record card controlled tabulating machine.

In the drawings.

In the drawings like references designate the same or similar parts.

The invention is particularly intended for use in a record card controlled tabulating machine of the kind described in United States patent specification No. 2,242,095 issued to Arthur Thomas, May 13, 1941, and will now be described by way of example as applied to such a machine.

Such a machine has a stop basket of which the stops are settable through the agency of connection box wires from the sensing pins in an item sensing pin box in the manner described in the aforesaid Patent No. 2,242,095. In the stop basket the zero stop in each column is lowered automatically against the action of its spring when any other stop in the same column is raised, thereby releasing the corresponding swinging sector and permitting it to move forward to the raised stop.

Figures 1, 3:
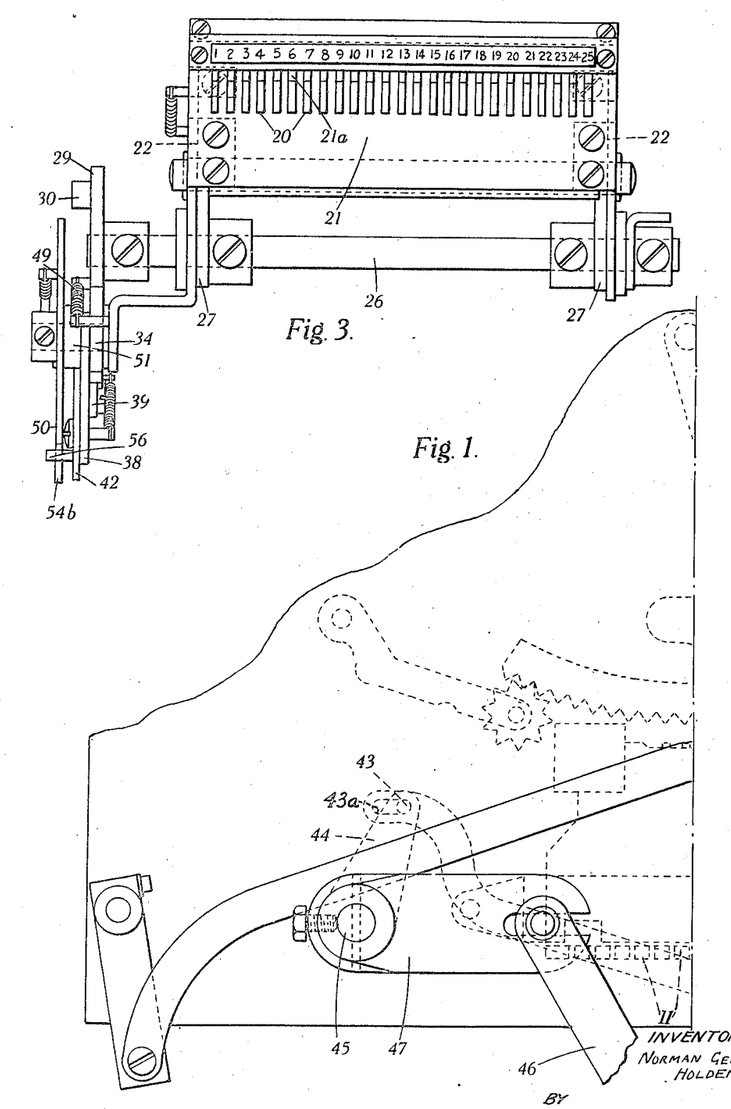
Figures 1 and 1A together show the location of the designating control mechanism in the adding head of the tabulator.
Figure 3 shows the mechanism in rear elevation.
Figures 1A, 4:
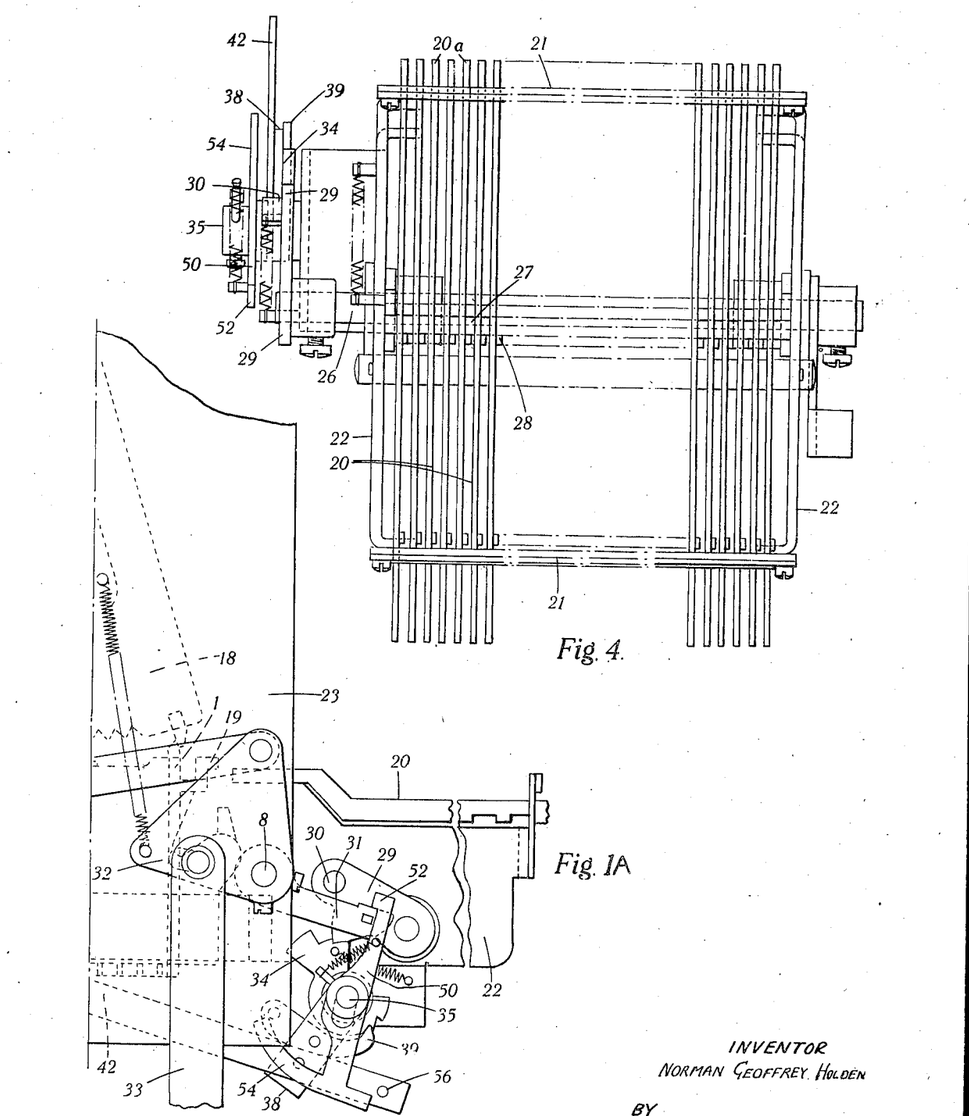
Figure 4 shows it in plan.
Figure 2:
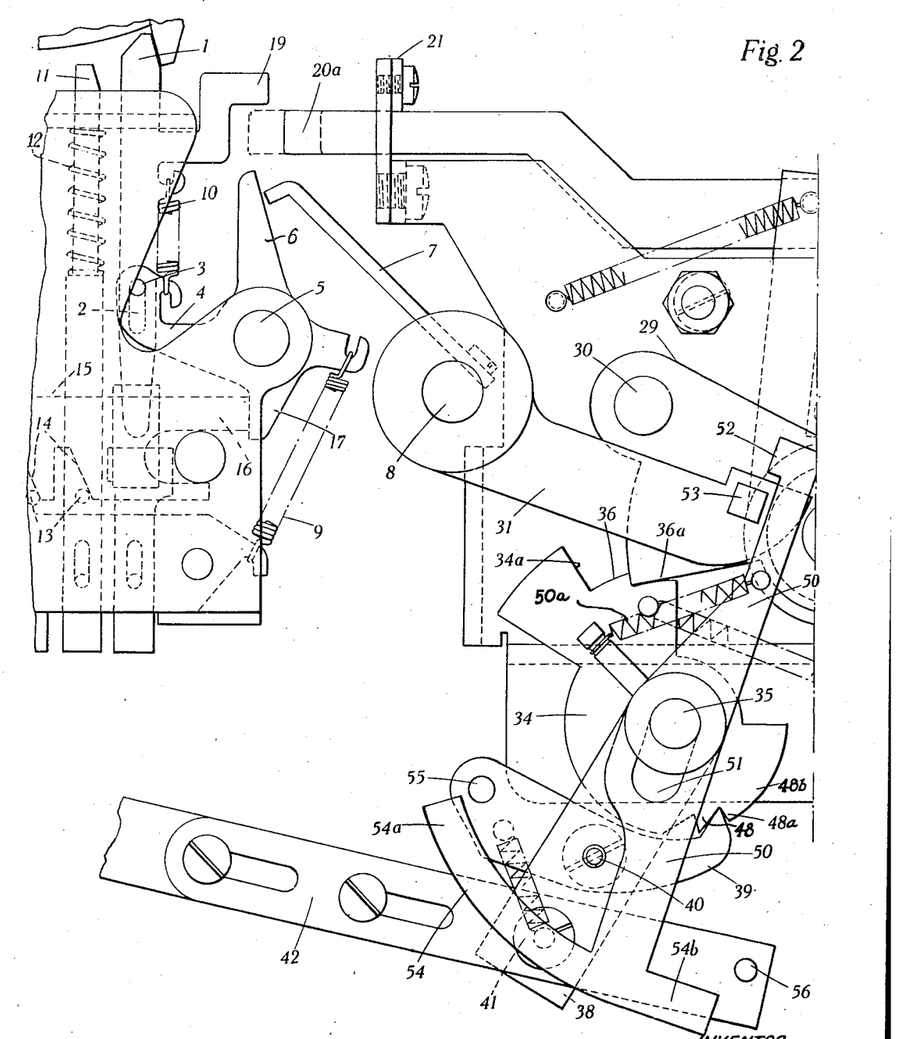
Figures 2 and 2A show the mechanism of the invention in side elevation to an enlarged scale.
Figure 2A:
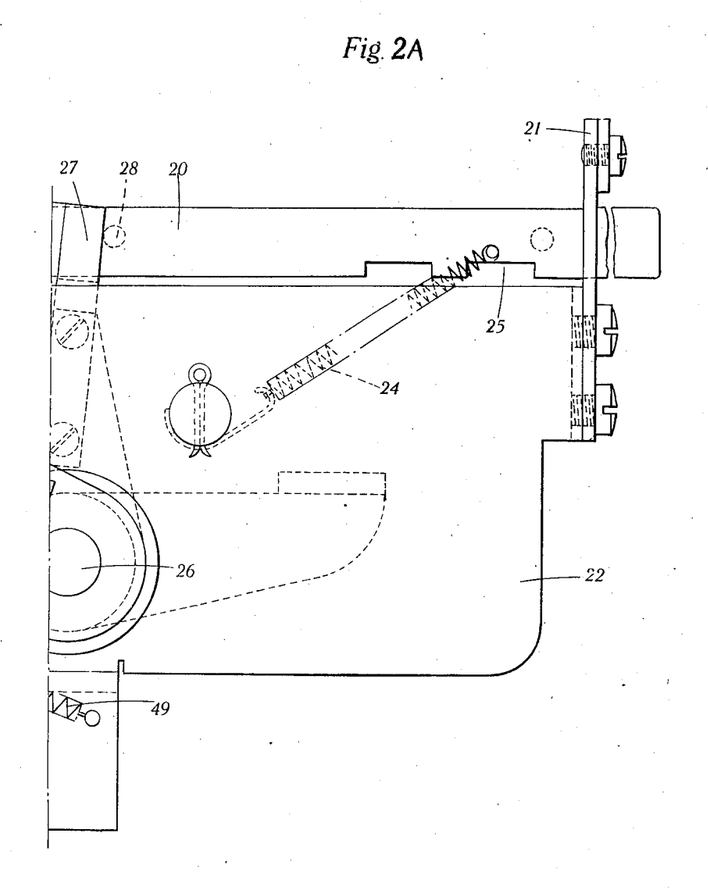
Figure 5:
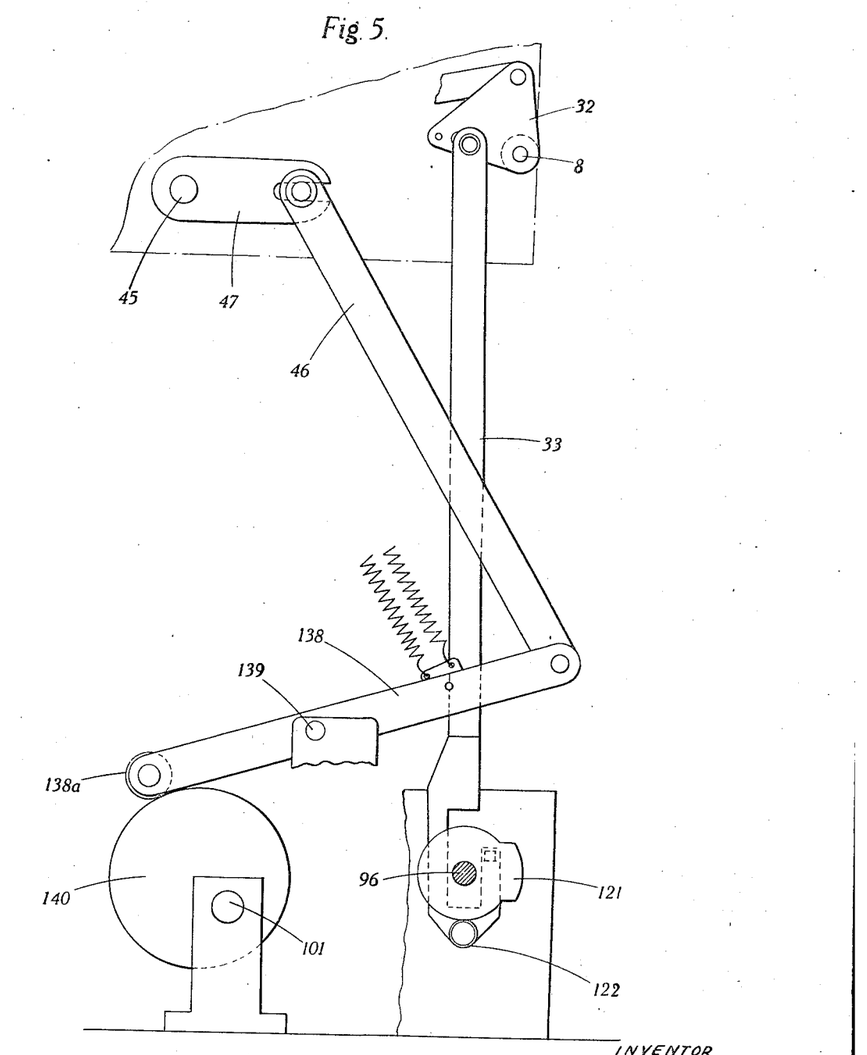
Figure 5 shows mechanism for actuating the mechanism shown in Figures 1 and 2, and Figures 6 and 6A together illustrate diagrammatically the mechanism for initiating a total taking operation.

In the construction shown in the drawings the zero stop 1 in each column is formed with a slot 2 in which engages a pin 3 carried by one arm 4 of a bell crank pivoted on a shaft 5 (Figure 2), the other arm 6 of the bell crank being normally disposed adjacent a bail 7 secured to the back total shaft 8 of the machine (Figures 1 and 2). A spring 9 maintains the bell crank 4, 6 in the position shown in Figure 2 and a spring 10 attached to the zero stop 1 maintains the upper end of the slot 2 in engagement with the pin 3.

The other stops in the stop basket, of which one is indicated at 11 in Figure 2, are normally held down by springs 12 and each stop carries a pin 13 co-operating with a cam face 14 on a slide 15 of which the end 16 abuts against a tail 17 of the bell crank 4, 6.

When any stop 11 is raised by the action of a sensing pin (not shown) finding a hole in a card, its pin 13 acts on the cam surface 14 and pushes the slide 15 to the right in Figure 2 whereby the bell crank 4, 6 is rocked in a counter-clockwise direction. This movement of the bell crank causes the arm 4 thereof to pull the zero stop 1 downwards through the action of spring 10 thereby releasing the associated sector 18 (Figure 1) so that the latter can move up to the stop 11 which has been set from the card.

In handling designations it is desired to print the designation only from the first card of a group and also when the total of the items relating to that group is printed. To this end the following preferred construction according to the invention may be employed.

The zero stop 1 for each column in which designations are to be punched is provided with a lug 19 co-operating with a locking slide 20 carried in slots 21a formed in guides 21 mounted on a frame comprising side plates 22 attached to the frame 23 of the adding mechanism of the tabulator.

Each locking slide 20 is pulled to the left in Figure 2 by a spring 24 and is formed with a recess 25 which, by pulling the slide to the right, can be engaged with the lower edge of the slot 21a in the right-hand guide 21 whereby the slide 20 is held permanently to the right in its inoperative position.

When a slide 20 is permitted to move to the fullest extent to the left in Figure 2 the left-hand end 20a of the slide engages under the lug 19 on the stop 1 and prevents the stop from moving downwardly. If one of the stops 11 is raised when the zero stop 1 is thus held up, the bell crank 4, 6 rocks counter-clockwise as before but the spring 10 extends and the pin 3 moves to the bottom of the slot 2. By this means, although a stop 11 may be raised in the column concerned the corresponding sector 18 is unable to take a setting from this stop because the zero stop 1 is still raised. Also the corresponding printing hammer is unable to operate since, in the known manner, the hammer is only released for operation when the sector 18 leaves its normal position.

On a total printing cycle and when the item on the first card of a group is being printed, however, it is desired to print also the corresponding designation and it is necessary, therefore, to release the zero stops 1 both on a total cycle and on the next following cycle, i. e. the cycle in which the first card of a new group is being handled.

To this end the following mechanism is preferably employed.

Secured to a shaft 26 is a bail 27 in the form of a comb between the teeth of which the locking slides 20 pass, each slide having a pin 28 whereby rocking of the bail to the right in Figure 2 pushes the slides away from the locking position and the movement thereof in the other direction releases the slides to the action of their springs 24.

In order to explain the operation of the mechanism it is convenient to describe it as being in the position which it occupies immediately after a total taking operation. This position is shown in Figure 2.

Secured to the shaft 26 on which the bail 27 is mounted is an actuating plate 29 carrying a pin 30 overlying a resetting lever 31 on the back total shaft 8 (Figures 1 and 2) of the tabulator which is rocked when a total cycle occurs.

In order to rock the back total shaft 8 a bell crank plate 32 is secured thereto and pivoted to the plate 32 is a link 33 which is pulled down by a cam 121 on the total shaft 96 described in the aforesaid United States patent specification No. 2,242,095 issued to Arthur Thomas, May 13, 1941.

The shaft 96 is caused to make one revolution when a change in designation is detected by the designation pin box P.

Figure 6:
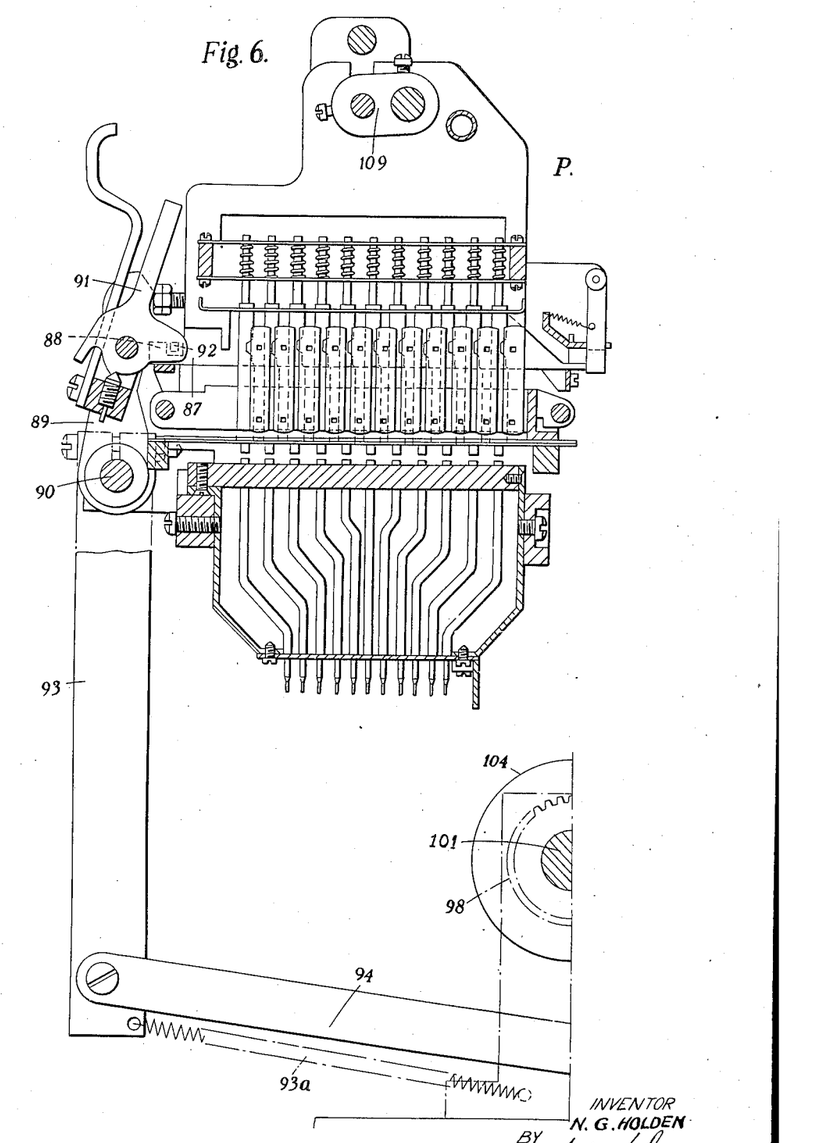
Figure 6A:
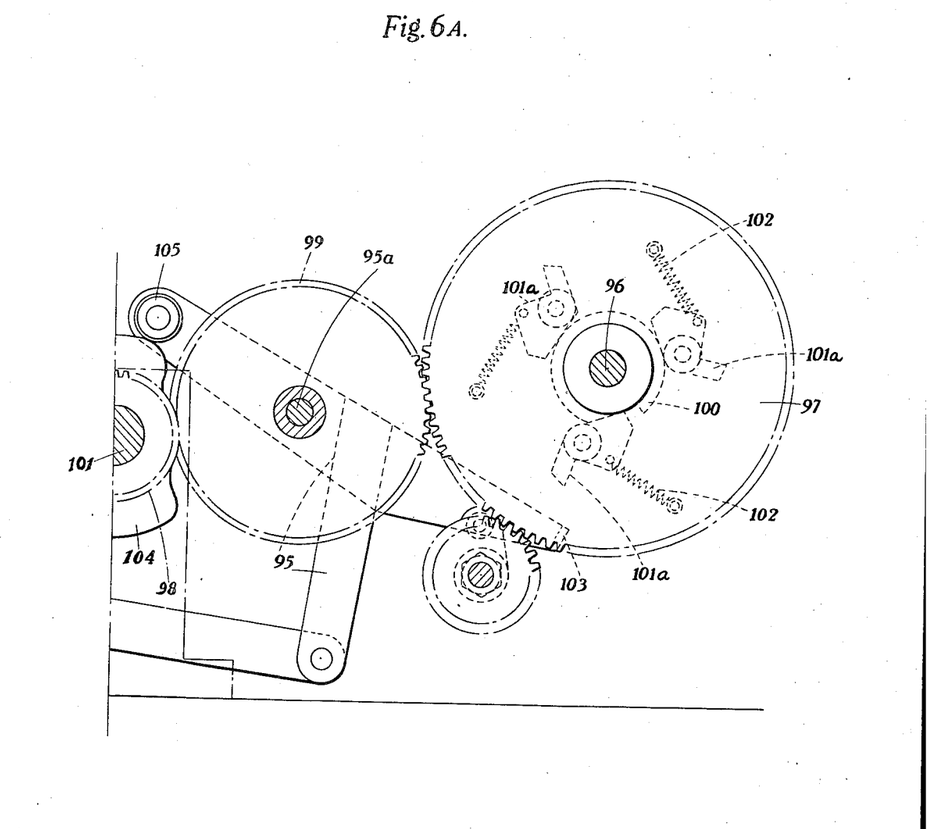

The designation pin box P is constructed in substantially the same manner as the pin box described in United States patent specification No. 1,661,684 issued March 6, 1928, and includes a plurality of testing bars 87, one for each column (Fig. 6).

Each testing bar is formed with a slot 88 at one end, this slot being open upwardly and disposed adjacent the slotted ends of the testing bars is a frame 89 secured to a shaft 90 and carrying a number of pivoted latches 91, one for each testing bar. Each latch has a projection 92 which can engage in the slot 88 in the end of its associated testing bar when the latch is moved to a given position. By this means any desired number of the testing bars 87 can be coupled to the frame 89.

At each cycle of the machine, as long as there is agreement between successive cards passing through the designating pin box, all the testing bars 87 are free to reciprocate as described in specification No. 1,661,684 and they therefore permit rocking of the frame 89 together with the shaft 90 to which it is secured. When, however, there is disagreement between two successive cards one or more of these testing bars 87 will be arrested and consequently the frame 89 will fail to rock.

As described in the Thomas Patent No. 2,242,095 aforesaid there is also secured to the shaft 90 a lever 93 connected through a link 94 to a clutch control lever 95 serving to control a clutch for connecting the shaft 96 to the tabulator main shaft 101.

This clutch comprises a disc 97 which is continuously rotated from the tabulator main shaft through a gear wheel 98 secured to the main shaft and engaging a gear wheel 99 which in turn engages teeth on the periphery of the disc 97, the gear ratio being such that the disc 97 makes one revolution to each three revolutions of the main shaft 101.

Secured to the total shaft 96 is a driven clutch member 100 and secured to the disc 97 which is driven from the main shaft are three latches 101a which are normally held by springs 102 in such a position that any one of the latches would engage the clutch member 100 and rotate the total shaft 96.

Normally however the clutch control lever 95 is in such a position that as the disc 97 rotates a lug 103 on the clutch control lever engages each latch 101a as it comes round and deflects it from the clutch member 100 so that it does not engage therewith and the total shaft 96 remains stationary. When a total cycle is to occur, however, the clutch control lever 95 is held out of the path of the latches 101a and consequently one of these latches engages with the clutch member 100 and causes rotation of the total shaft.

Secured to the main shaft 101 is a cam 104 with which engages a roll 105 on one end of the clutch control lever 95, the roll 105 being held in engagement with the cam 104 by a spring 93a attached to the lever 93. The cam 104 is so shaped that while a card is entering the designation pin box P and is being sensed the cam 104 holds the clutch control lever 95 clear of the latches 101a on the aforesaid disc 97. Just before the testing bars 87 commence to reciprocate however, the cam 104 releases the clutch control lever 95 which can then move into the path of the latches 101 under the action of spring 93a provided that all the testing bars are free to move, that is to say provided that there is no change in designation. If, however, there is a change the testing bars 87 will fail to move and consequently the frame 90 to which they are connected by their respective latches 89 will also fail to move and this frame, being connected to the clutch control lever 95, will also hold the latter out of the path of the latches 101a on the clutch control disc 97 so that the total shaft 96 will be coupled to said disc and will make one revolution.

At total taking the shaft 96 makes one revolution which occupies three revolutions of the shaft 101 and commences at 335° in a revolution of the shaft 101.

The cam 140 commences to rock the shaft 45 at 320° in each revolution of shaft 101 and this rocking movement is completed in one direction at 122° in the following revolution. At 128° in this same following revolution the shaft 45 commences to return and is fully restored at 290°.

The cam 121 pulls down the link 33 at 315° in the next revolution but one after the shaft 96 has commenced to rotate and at 265° in the next following revolution the link 33 is returned upwardly by a spring.

Co-operating with the actuating plate 29 for the bail 27 is a latch plate 34 pivoted on another shaft 35 and provided with two peripheral steps 36, 36a, either of which the actuating plate 29 can engage. In the position shown in Figure 2 the actuating plate 29 is in engagement with the lowermost step 36a whereby the bail 27 is held in an intermediate position in which it holds the locking slides 20 in a position in which the locking slides 20 have moved half way towards their locking position but have not yet engaged under the lugs 19 on the stops 1.

Pivoted on the shaft 35 on which the latch plate 34 is also pivoted is an arm 38 to which a pawl 39 is pivoted at 40 and this arm 38 is pivoted at 41 to a link 42 connected at 43 (Figure 1) to an arm 44 on the sector restoring shaft 45 which is rocked through a link 46 and arm 47 at each revolution of the tabulator main shaft by means of a cam 140. The link 46 is pivoted to a lever 139 actuated by a cam 140 on the main shaft 101 as described in the Patent Specification No. 2,242,095 aforesaid.

As already explained Figure 2 shows the parts in the positions which they occupy at the end of a total taking operation.

During the next revolution of the main shaft of the machine the data from the first card of the next group is printed. The sensing of this card by the item sensing pin box and the setting of the stops therefrom occurs towards the end of the preceding revolution the setting of the stops being completed at 360° in that preceding revolution and at this time the pawl 39 remains in the position shown in Figure 2 since the slot 43a permits the arm 44 on the sector restoring shaft 45 to move to a limited extent before moving the link 42.

Consequently when the stops 11 are set from the first card of a group the locking slides 20 remain clear of the zero stops 1 and the latter are able to move down, so that the sectors 18 can take a setting from the stops 11 and the designation on the first card of the group is printed.

Immediately after the stops have been set the link 42 rocks the arm 38 clockwise whereby the pawl 39 drops behind the tooth 48, then on the return of arm 38 pawl 39 by acting on tooth 48 turns the latch plate 34 counter-clockwise until the actuating plate 29 drops off the step 36a and is arrested by the pin 30 engaging the resetting lever 31. This movement of the plate 29 permits the bail 27 to rock counter-clockwise whereby the ends 20a of the slides 20 engage under the lugs 19 on the stops 1, thereby preventing printing of the designation from the following cards of the group.

As each card passes through the machine the pawl 39 rocks idly along the undersurface of the plate 34 adjacent the tooth 48, but without effecting any movement of the plate 34.

At the end of the group when the designation changes, the card feed is arrested, and the back total shaft 8 rocks, whereupon the resetting lever 31 secured thereto swings the operating plate 29 and the bail 27 (clockwise in Figure 2) into a position in which the bail holds all the locking slides in their extreme position (to the right in Figure 2) in which they are disengaged from the lugs on the stops, leaving the latter free.

The resetting lever 31 on the back total shaft also simultaneously releases the pawl 39 from engagement with the tooth 48 on the latch plate 34, whereupon the latter swings under the action of a spring 49 until the surface 34a thereof engages the actuating plate 29 for the bail 27.

Therefore, when the total is printed, the zero stops 1 being free, the designation is printed with it, this designation having been of course entered into the corresponding accumulator wheels from the first card of the group.

In order to permit the resetting lever 31 to release the pawl 39 the following construction may be employed.

Pivoted on the shaft 35 about which the pawl-carrying arm 38 rocks is a trip member 50 which has a slot 51 through which the shaft 35 passes so that the lever 50 is capable of a limited longitudinal movement.

At the upper end of this trip member 50 is a lug 52 which, while the cards are passed through the machine, lies over a pin 53 on the resetting lever 31 and at the lower end of the trip member is an arcuate extension 54 having as centre the shaft 35 about which the pawl-carrying arm 38 rocks.

When the back total shaft 8 rocks the resetting lever lifts the trip member 50 by acting on the lug 52 and one portion 54a of the arcuate extension thereon engages a pin 55 on the tail of the pawl 39 and rocks the latter clear of the teeth on the latch plate 34. By reason of the arcuate shape of this extension 54 and the fact that its centre is that about which the pawl-carrying arm 38 rocks, the extension is able to release the pawl at whatever position in its travel the latter may be.

It may here be pointed out that there are only two teeth 48, 48a on the latch plate 34 and that while the cards are passing through the machine the pawl 38 is rocking idly just beyond the second of these tees (i. e. the left-hand tooth 48 in Figure 2).

After the latch plate 34 has swung to the position in which the surface 34a thereon is in engagement with the actuating plate 29 for the bail, and before the back total shaft 8 has rocked back to its normal position a pin 56 on the pawl operating link 42 strikes one end 54b of the arcuate extension 54 thereby rocking the trip member 50 carrying said extension so that the lug 52 thereon clears the pin 53 on the resetting lever 31 and thereupon the spring 50a, which is attached to the trip member 50, pulls the latter down until the extension 54 is clear of the pin 55 on the tail of the pawl 39 thereby allowing the latter to engage the surface 48b of plate 34 to the right of the first tooth (the right-hand tooth 48a in Figure 2) on the latch plate 34 which, by reason of the movement of the latter, is now in register with the pawl 39. Then when the back total shaft 8 rocks to its normal position the pin 53 on the resetting lever 31 resumes its position below the lug 52 on the end of the lever 50.

Also when the back total shaft 8 rocks to its normal position the plate 29 is prevented from following it by the shoulder 36 on the plate 34. Consequently the slides 20 remain in their extreme right-hand position.

When the first card of the new group enters the machine the rocking of the sector restoring shaft 45 causes the pawl 39 to engage tooth 48a and step the latch plate 34 round one tooth so that the operating plate 29 for the bail 27 moves on to the lower step 36a on the latch plate 34, whereby the locking slides 20 are moved half way towards their locking position but the zero stops 1 are still free. Consequently the designation is printed from the first card of the new group, and is at the same time entered into the designation storing accumulator from which it is printed at the next total taking cycle. Then on the next movement of the sector restoring shaft the pawl 39 steps the latch plate 34 round one tooth more, thereby permitting the bail 27 to move into the position in which the slides 20 lock the zero stops 1 so that no further designations are accumulated or printed until the next total cycle occurs.

Each of the locking slides is independently movable by hand into a position in which it is inoperative and the recess 25 permits each slide to be latched in the inoperative position. By this means, the mechanism according to the invention can be made to operate on any desired column of the card at will, all other columns being cut out.

The invention therefore includes as a feature a record card tabulating machine having a plurality of printing elements, and selecting means whereby any desired printing elements may be caused to print on a total cycle and from the first card following a total cycle, said printing elements being rendered inoperative at other times, while the remaining printing elements are operative all the time.

What I claim is:

In a record controlled tabulating machine of the kind including a plurality of denominational actuators, an accumulator wheel to each actuator, a corresponding plurality of denominational columns of stops, each column including a zero stop normally effective to block movement of the corresponding actuator, and means whereby the setting of any other stop in a column tends to render the zero stop for that column ineffective, means operative in each machine cycle to free the actuators for movement under control of the corresponding stops to take a setting from said stops, said means being also operative to restore said actuators, accumulator wheel control mechanism normally conditioned to effect engagement of the wheels with the actuators after they have been set from the stops, and a total shaft serving, when actuated, to condition the accumulator wheel control mechanism to effect engagement of the wheels with the actuators before said actuators have been freed for movement, the combination of a locking member to each zero stop, resilient means individual to each locking member urging said member into engagement with its associated zero stop to maintain said stop effective, each of said locking members being mounted for individual withdrawal manually from engagement with its zero stop, means for manually latching each locking member individually in the withdrawn position, means operated by the total shaft to withdraw from engagement with their associated zero stops all those locking members which are unlatched, a second latching means common to all said locking members, resilient means rendered effective when said locking members are thus withdrawn by the total shaft to cause said common latching means to retain said locking members withdrawn, a pawl and ratchet device adapted to release said common latching means in stages, one stage at each actuation of the pawl, and means for actuating the pawl at each machine cycle to effect one stage of the release of said common latching means at each machine cycle until the release is completed, the relation between the pawl and ratchet device and said common latching means being such that the release of said latching means is complete after the data on the first record following a total has been read and entered into the accumulator wheels.

NORMAN GEOFFREY HOLDEN.